United States Patent
Scheuerman et al.

(10) Patent No.: US 7,896,219 B2
(45) Date of Patent: Mar. 1, 2011

(54) METHOD AND APPARATUS FOR ULTRASONIC WELDING OF TERMINALS

(75) Inventors: Robert J. Scheuerman, Washington, MI (US); Rick F. Rourke, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 12/396,533

(22) Filed: Mar. 3, 2009

(65) Prior Publication Data

US 2010/0224671 A1    Sep. 9, 2010

(51) Int. Cl.
*B23K 20/10*    (2006.01)
(52) U.S. Cl. ............... 228/110.1; 228/901; 228/1.1; 228/111
(58) Field of Classification Search ............... 228/901, 228/110.1, 1.1, 111
See application file for complete search history.

(56) References Cited

U.S. PATENT DOCUMENTS

| | | | | |
|---|---|---|---|---|
| 6,641,027 B2 * | 11/2003 | O'Connell et al. | ....... | 228/110.1 |
| 6,821,367 B1 * | 11/2004 | MacDonald et al. | ....... | 156/73.3 |
| 2005/0037261 A1 * | 2/2005 | Inoue et al. | ................. | 429/211 |

* cited by examiner

*Primary Examiner* — Jessica L Ward
*Assistant Examiner* — Erin B Saad

(57) ABSTRACT

A method and apparatus for welding of battery terminals to an interconnect includes: juxtaposing two or more battery cell terminals to each other to create a terminal stack including an innermost terminal and an outermost terminal; juxtaposing a battery cell interconnect with the innermost terminal of the stack; positioning an anvil in contact with the interconnect; directing an air stream against the outermost terminal so that the air stream compresses the terminal stack and urges the innermost terminal into contact with the interconnect; positioning a sonotrode horn in contact with the outermost terminal; and energizing the sonotrode horn to vibrate the terminal stack and thereby make an ultrasonic weld between the stacked terminals of the terminal stack and the interconnect. The air stream is directed at the terminal below the sonotrode horn to capture any debris and a suction removes the debris.

10 Claims, 2 Drawing Sheets

METHOD AND APPARATUS FOR ULTRASONIC WELDING OF TERMINALS

FIELD OF THE INVENTION

The present invention relates to a method and apparatus for the ultrasonic welding together of a stack of battery terminals with an interconnect member.

BACKGROUND OF THE INVENTION

Rechargeable energy storage systems for motor vehicles are assembled by electrically connecting together a plurality of individual battery cells. For example, lithium-ion battery cells typically include a soft housing pouch having a positive terminal and a negative terminal extending outwardly from the pouch. These battery cells are positioned side by side in a battery case to bring the positive terminals together and the negative terminals together, thereby creating a stack of terminals to make a parallel electrical connection between the individual cells. These terminal stacks need to be attached to an interconnect member which will in turn connect to other such sub-assemblages of the battery cells.

It would be desirable to use ultrasonic welding to attach the stack of terminals to the interconnect member. However, such an ultrasonic welding operation requires that the terminal tabs be precisely aligned and positioned with respect to each other and with respect to the interconnect board prior to the making of the ultrasonic weld between the terminal tabs and the interconnect board. In addition, there is a concern that any debris created during the ultrasonic welding can be injurious to the pouches if the debris is allowed to fall between the individual pouches.

SUMMARY OF THE INVENTION

The present invention provides a method and apparatus for welding of stacked battery terminals to an interconnect member and comprises generally juxtaposing two or more battery cell terminals to each other to create a terminal stack that includes an innermost terminal and an outermost terminal. The interconnect member is juxtaposed with the innermost terminal of the stack and an anvil is positioned against the interconnect member. An air stream is directed against the outermost terminal of the stack so that the air stream will compress the terminal stack and urge the innermost terminal into contact with the interconnect member. The sonotrode horn of an ultrasonic welder is then positioned in contact with the outermost terminal and is energized to vibrate the terminal stack and thereby make an ultrasonic weld between the stacked terminals of the terminal stack and the interconnect member. In addition, the air stream is directed at the terminal stack at a line of contact vertically below the sonotrode horn so that the air stream provides an air curtain to capture any debris that is created during the ultrasonic welding and prevent the debris from falling downwardly between the battery pouches. In addition, a suction is provided adjacent to the sonotrode horn to suction away the debris captured by the air curtain.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is exemplary in nature and is not intended to limit the invention, its application, or uses.

Figure 1:
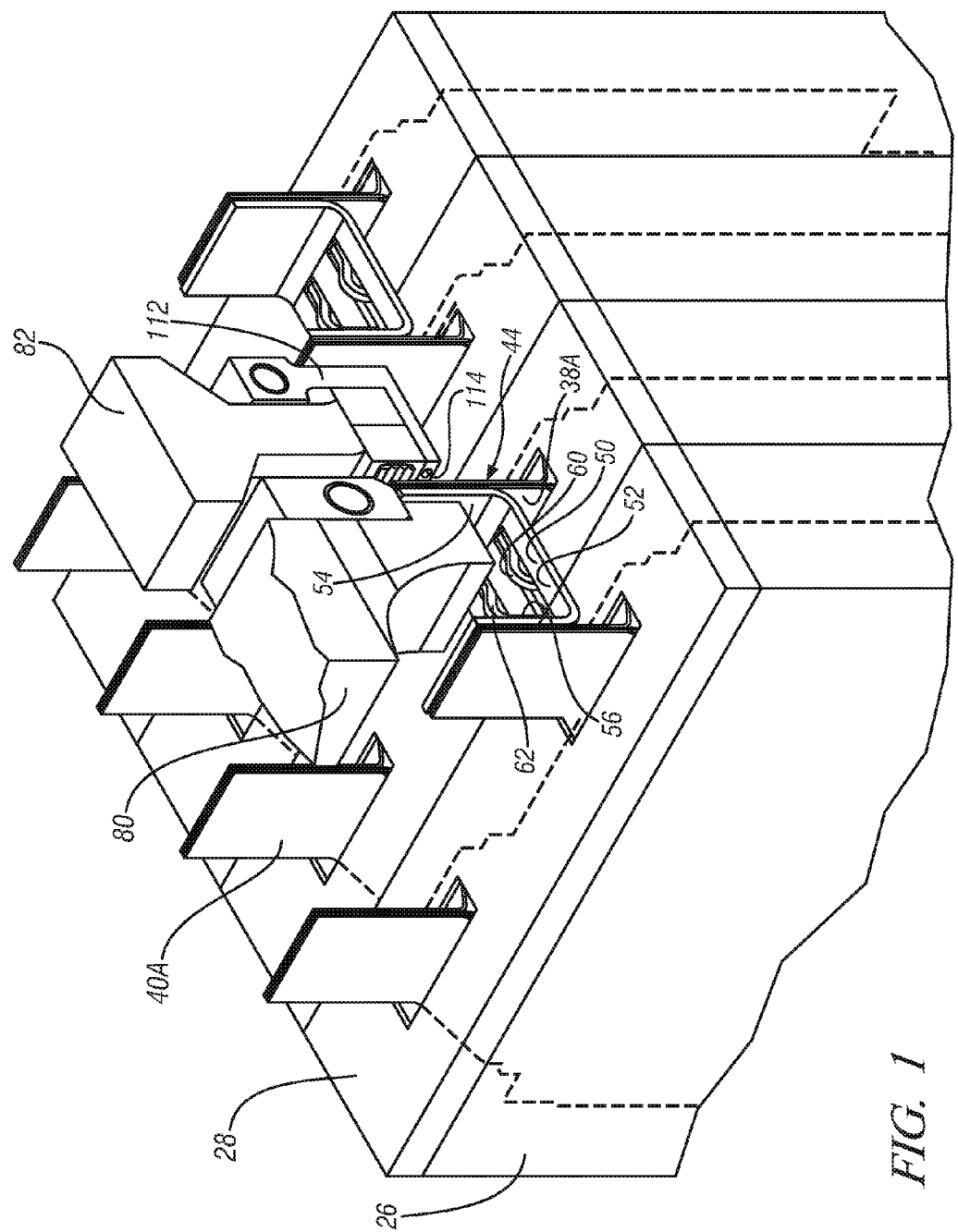
FIG. 1 is a perspective view showing the battery cells and the ultrasonic welding device according to the invention.
Figure 2:
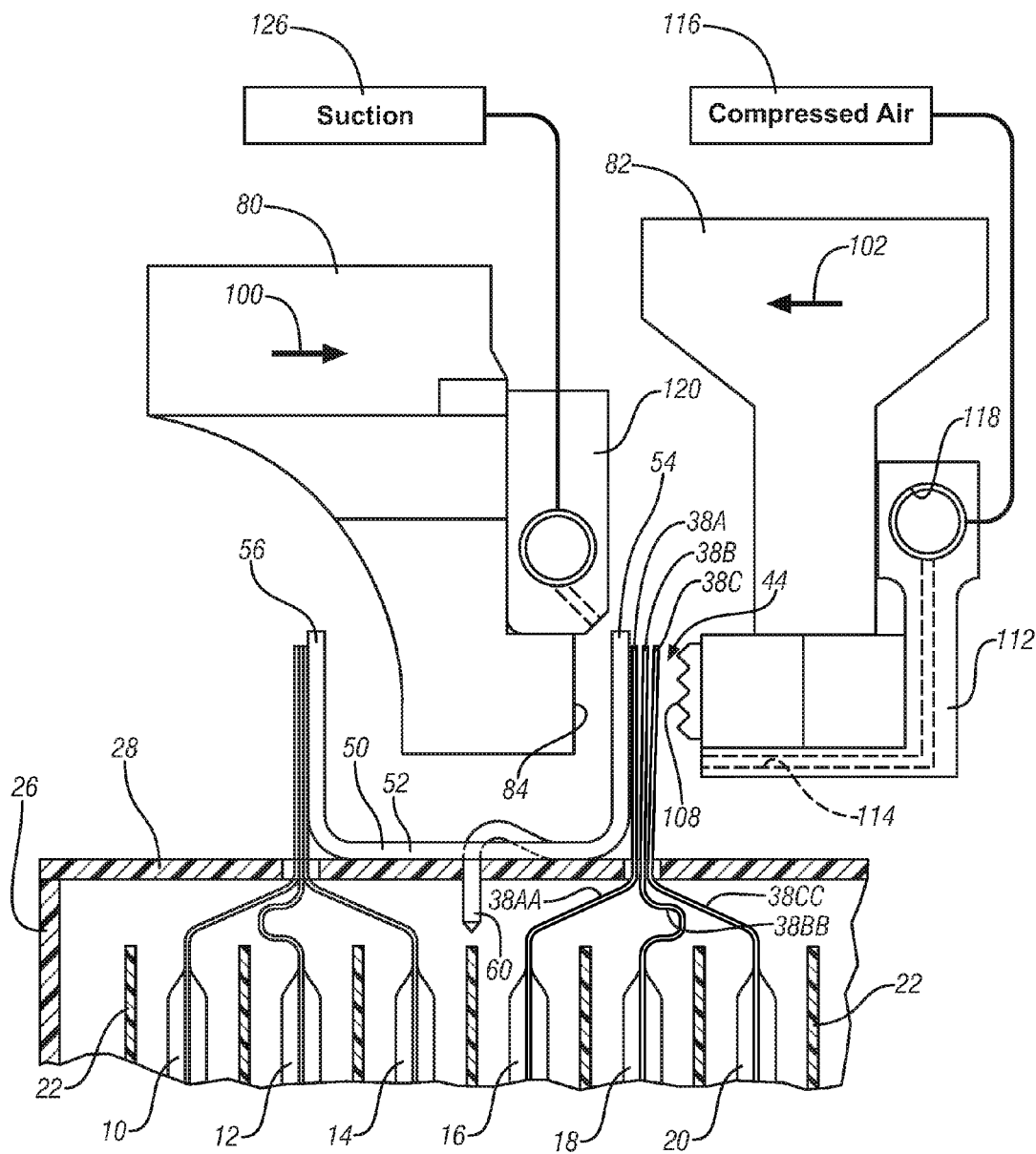
FIG. 2 is an end view showing the battery cells and the ultrasonic welding device according to the invention.

Referring to FIG. 2, it is seen that a battery pack or module, generally indicated at 8, has a plurality of individual battery cell pouches 10, 12, 14, 16, 18, and 20 are arranged side by side within a battery case 26 having a lid 28. Each of these battery cells pouches is a flexible bag-like container of lithium ion or other energy storage medium. The pouches are constructed of a relatively flexible material such as foil. The pouches are supported and separated in their side by side positions of FIG. 2 by support frames 22, as well insulators, heat exchangers and other structures that are not shown in the drawing. The battery cell pouch 16 is typical and includes a positive terminal 38A that extends out of the pouch 16. Also, as shown in FIG. 1, a negative terminal 40A extends out of the pouch 16. The positive terminal 38A is typically copper with a nickel coating and has a thickness of 0.2 mm. The negative terminal 40A is typically made of aluminum and has a thickness of approximately 0.2 mm.

As seen in FIG. 2, the individual cells 16, 18 and 20 pass through an opening 46 in the lid 28 and are to be electrically connected together by juxtaposing the positive terminals 38A, 38B, and 38C of the three cells together to create a terminal stack 44, and then welding the terminal stack 44 to an interconnect member or board 50. The interconnect member 50 is generally U-shaped with a base 52 and upstanding legs 54 and 56. The base 52 has stakes 60 and 62 struck downward therefrom which will be imbedded in the case of the battery so that the interconnect member is fixed upon the case.

The terminal 38A can be considered the innermost of the terminals of the terminal stack 44 in the sense that the terminal 38A is the closest to the leg 54 of the interconnect member 50. The terminal 38A has a lateral bend 38AA by which the terminal 38A reaches over to contact with the terminal 38B. The terminal 38C can be considered the outermost of the terminals of the terminal stack 44 in the sense that the terminal 38C is the furthest away from the leg 54 of the interconnect member 50. The terminal 38C has a lateral bend 38CC by which the terminal 38C reaches over to contact with the terminal 38B. The terminal 38B has a return lateral bend 38BB.

Thus, as seen in FIG. 2, the terminals 38A, 38B, and 38C are loosely stacked together with 38A being the innermost terminal of the terminal stack 44 and closest to the interconnect member 50, the terminal 38C being the outermost terminal the furthest from the interconnect member, and terminal 38B being the center terminal in the stack 44 and sandwiched between the terminals 38A and 38C.

As seen in FIG. 1, the ultrasonic welding will be performed by an ultrasonic weld mechanism that includes an anvil 80 and a sonotrode horn 82. The anvil 80 and the sonotrode horn 82 are mounted on a multi-axis manipulating mechanism, not shown, by which the anvil 80 and horn 82 can be lowered to the position shown in FIGS. 1 and 2 where an anvil surface 84 of the anvil 80 is located adjacent the interconnect board vertical leg 54 and the horn 82 is located adjacent but spaced from the outermost terminal 38C of the terminal stack 44. The anvil 80 is moved rightwardly in the direction of arrow 100 into supporting contact with the vertical leg 54 so that the anvil 80 will support the interconnect board 50 against movement. The horn 82 will be moved leftwardly in the direction of arrow 102 to bring serrated gripping fingers 108 of the sonotrode horn 82 into contact with the outermost terminal 38C of the terminal stack 44.

As seen in FIGS. 1 and 2, an air knife mechanism 112 is mounted on the underside of the horn 82 and includes a horizontal air outlet slot or slots 114. The air knife mechanism 112 is connected to a supply of compressed air 116 via a port 118 by which a compressed air stream is blown against the terminal stack 44 as the horn 82 is moving leftwardly to contact with the terminal stack 44. This air stream or air curtain will function to urge the terminal stack 44 leftwardly into contact with the vertical leg 54 of the interconnect board 50 so that the terminal stack 44 will be in a compressed together condition and properly positioned for contact by serrated fingers 108 provided on the horn 82.

After the leftward movement of the horn 82 into contact with the terminal stack 44, the sonotrode horn 82 will be cycled at 10,000 cycles per second to vibrate the serrated fingers 108 which in turn will vibrate the terminal stack 44 against the interconnect board vertical leg 54. This vibration is continued at a certain pressure and for a certain time until the individual terminals 38A, 38B, and 38C of the terminal stack 44 are ultrasonically welded to each other and the innermost of the terminals 38A is welded to the interconnect board vertical leg 54. As seen in the drawings, the air stream is provided by the air knife 112 located just below the serrated fingers 108. The air stream flow is maintained during this ultrasonic welding operation in order to create an air curtain that underlies the location of the ultrasonic weld so that any debris that might be created during the making of the ultrasonic weld will be captured by the air curtain and not permitted to fall downwardly between the battery cell pouches.

In addition, as shown in FIG. 2, an air suction device 120 is located just above the serrated fingers 108 and has a port 122 connected to suction device 124 and connected to nozzle or nozzles 126 that are located just above the terminal stack 44 so that the suction device 120 will function to vacuum away the debris that has been captured by the air curtain. The suction device 120 is shown mounted upon the anvil 80 but will be understood that the suction device 120 can be mounted on either the horn 80 or the anvil 82. Or suction devices can be mounted on both of the horn 80 and the anvil 82.

It will be understood that during the high speed vibration of the terminal stack 44 by the sonotrode horn 82, the lateral portions 38AA, 38BB, and 38CC of the terminals will flex slightly so that the vibratory energy is absorbed within the terminal tabs and not transmitted downwardly into the individual battery cells.

After the making of the ultrasonic weld between the terminal tabs 38A, 38B, and 38C and the interconnect board 50, the horn 82 and anvil 80 will be moved away from one another and a multi-access manipulating mechanism will relocate the anvil 80 and horn 82 to the location of the next to be welded together terminal stack and interconnect board.

Thus, it is seen that the invention provides a new and improved method and apparatus for the ultrasonic welding of battery cell terminals to an interconnect board. The description of the invention is merely exemplary in nature and, thus, variations thereof are intended to be within the scope of the invention.

What is claimed is:

1. A method for welding of battery terminals to an interconnect comprising;
   juxtaposing two or more battery cell terminals to each other to create a terminal stack including an innermost terminal and an outermost terminal;
   juxtaposing a battery cell interconnect with the innermost terminal of the stack;
   positioning an anvil in contact with the interconnect;
   directing an air stream against the outermost terminal after the anvil is positioned in contact with the interconnect so that the air stream compresses the terminal stack and urges the innermost terminal into contact with the interconnect;
   positioning a sonotrode horn in contact with the outermost terminal after the air stream has compressed the terminal stack and urges the innermost terminal into contact with the interconnect;
   and energizing the sonotrode horn to vibrate the terminal stack and thereby make an ultrasonic weld between the stacked terminals of the terminal stack and the interconnect.

2. The method of claim 1 further comprising the air stream being directed at the terminal stack at a line of contact vertically below the sonotrode horn so that the air stream provides an air curtain to capture any debris created during the ultrasonic welding from falling downwardly.

3. The method of claim 1 further comprising the air stream being provided by an air knife mounted below the sonotrode horn.

4. The method of claim 1 further comprising providing an air suction adjacent the sonotrode horn to suction away any debris created during the sonic welding.

5. The method of claim 1 further comprising providing an air suction adjacent the sonotrode horn to suction away any debris created during the sonic welding and the air suction being provided by a suction nozzle that is mounted on either or both of the anvil and the sonotrode horn.

6. The method of claim 1 further comprising providing an air stream directed at the terminal stack at a line of contact vertically below the sonotrode horn so that the air stream provides an air curtain to capture any debris created during the ultrasonic welding from falling downwardly and providing an air suction adjacent the sonotrode horn to suction away any debris created during the sonic welding.

7. The method of claim 1 further comprising each of the terminals having a lateral bend therein by which ultrasonic vibration induced during the ultrasonic welding is absorbed by the lateral bend.

8. A method for welding of battery terminals to an interconnect comprising;
   juxtaposing two or more battery cell terminals to each other to create a terminal stack including an innermost terminal and an outermost terminal;
   juxtaposing a battery cell interconnect with the innermost terminal of the stack;
   positioning an anvil in contact with the interconnect;
   after positioning the anvil, directing an air stream against the outermost terminal so that the air stream compresses the terminal stack and urges the innermost terminal into contact with the interconnect, said air stream being provided by an air knife mounted below the sonotrode horn so that the air stream is directed at the terminal stack at a line of contact vertically below the sonotrode horn so that the air stream provides an air curtain to capture any debris created during the ultrasonic welding and prevent the debris from falling downwardly;

after directing the air stream, positioning a sonotrode horn in contact with the outermost terminal;

and energizing the sonotrode horn to vibrate the terminal stack and thereby make an ultrasonic weld between the stacked terminals of the terminal stack and the interconnect.

9. The method of claim 8 further comprising establishing a suction to suction away any debris created during the sonic welding.

10. The method of claim 9 further comprising the suction being provided by a suction nozzle that is mounted on either or both of the anvil and the sonotrode horn.

* * * * *